United States Patent [19]
Martinez-Corral et al.

[11] Patent Number: 4,606,451
[45] Date of Patent: Aug. 19, 1986

[54] CLUTCH PLATE WITH TWO STAGE DAMPING MEANS

[75] Inventors: Cecilio Martinez-Corral, Madrid, Spain; Marcel Blond, Savigny-le-Temple, France

[73] Assignee: Valeo, Paris, France

[21] Appl. No.: 649,303

[22] Filed: Sep. 11, 1984

[30] Foreign Application Priority Data

Sep. 14, 1983 [FR] France ................. 83 14610

[51] Int. Cl.$^4$ .................. F16D 3/14; F16D 3/66; F16D 13/64
[52] U.S. Cl. ................ 192/106.2; 192/70.17; 464/63
[58] Field of Search ............ 192/106.2, 70.17; 464/63, 64, 68

[56] References Cited

U.S. PATENT DOCUMENTS

| | | | |
|---|---|---|---|
| 3,414,101 | 12/1968 | Binder et al. | 192/106.2 |
| 3,800,931 | 4/1974 | Maucher | 192/70.17 |
| 4,024,938 | 5/1977 | Maucher | 192/106.2 |
| 4,177,888 | 12/1979 | Arrowsmith | 192/106.2 |
| 4,433,771 | 2/1984 | Caray | 192/106.2 |
| 4,537,295 | 8/1985 | Fadler et al. | 192/106.2 |

FOREIGN PATENT DOCUMENTS

| | | |
|---|---|---|
| 1520684 | 4/1968 | France . |
| 2171835 | 9/1973 | France . |
| 2376333 | 7/1978 | France . |
| 1200013 | 7/1970 | United Kingdom . |
| 1385304 | 2/1975 | United Kingdom . |
| 1564974 | 4/1980 | United Kingdom . |

*Primary Examiner*—Lawrence Staab
*Attorney, Agent, or Firm*—Charles E. Brown; Charles A. Brown

[57] ABSTRACT

A clutch plate comprises a friction disc and a hub mounted for relative angular movement within a predetermined range. The hub and friction disc are coupled together by first and second stage dampers, the first being lower rated than the second. Each damper comprises a radial flange, two guide washers on respective sides of the flange and springs interposed circumferentially between each flange and its guide washers. The flange of the first stage damper is defined by one of the guide washers of the second stage damper and the guide washers of the first stage are fixed for rotation with the hub. The clutch plate comprises two subassemblies, one comprising the hub and the flange, guide washers and springs of the first stage damper and the other the flange and other guide washer of the second stage damper, the springs of the second stage damper being preferably part of the other subassembly.

10 Claims, 3 Drawing Figures

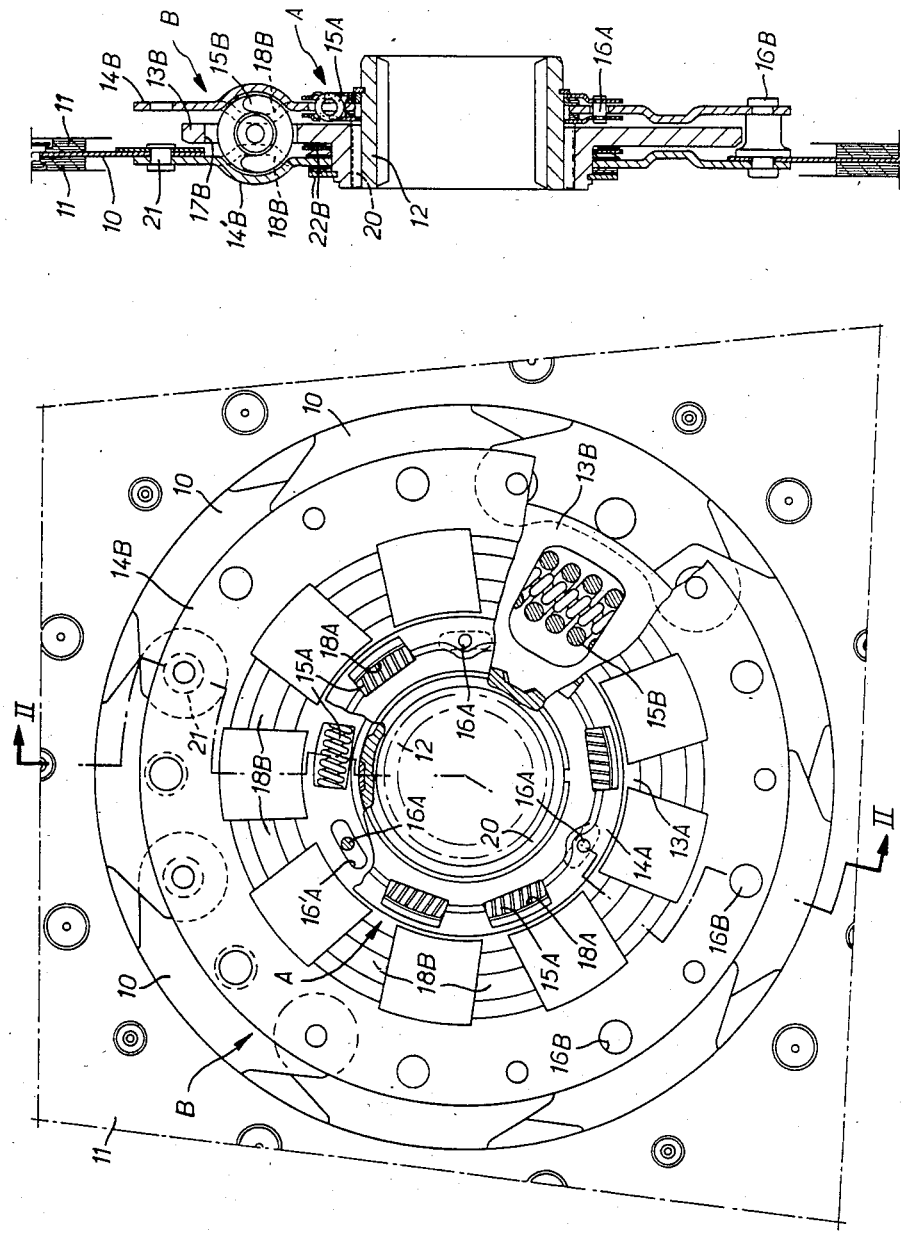

CLUTCH PLATE WITH TWO STAGE DAMPING MEANS

BACKGROUND OF THE INVENTION

The present invention relates generally to a clutch plate for a friction clutch.

The clutch plate comprises a friction disc carrying friction facings and a hub mounted for angular movement relative to each other within a predetermined range of angular displacement. The support member and the hub are coupled together by staged torsion damping means. The staged torsion damping means comprises a first, low-rated torsion damping means and a second, stiffer torsion damping means, each of the first and second stage damping means comprising a radial flange, two guide washers fixed to each other and disposed on axially opposite sides of the flange. Resilient means are interposed circumferentially between the flange and the guide washers. The first stage damping means is adapted to operate between the hub and the second stage damping means. The flange of the second stage is mounted with angular clearance on the hub whereas the friction disc is fixed to one of the guide washers of the second stage damping means.

The second stage damping means may also be staged and comprises resilient members of different stiffness operable in succession ; it has the main damping function during normal operation when the variable torque is transmitted by the friction disc, in either direction and thus operates to filter vibrations particularly in the case of use in a motor vahicle.

The second stage damping means, despite its efficacy in normal operating conditions, is found to be insufficient to efficiently absorb vibrations when the torque transmitted by the friction disc is very low or nil, such as found when a motor vehicle idles; in this mode of operation the second torsion stage is incapable of preventing the noises known as dead point or idling noises from developing.

That is the reason why the first stage torsion damping means operates as a pre-damper specially adapted for damping vibrations and noises in particular operation conditions in which the torque transmitted is very low, notably when the vehicle is idling.

Conventionally in friction clutch plates of the foregoing type, the flange of the first stage damping means is fixed for rotation with the hub whereas the washers of the first stage damping means are fixed to the second stage damping means.

Generally, in known constructions the assembling is complicated and has special requirements.

Further, the bulk is often considerable and mechanical strength is insufficient.

OBJECT AND SUMMARY OF THE INVENTION

An object of the present invention is to provide a clutch plate of the foregoing type which is devoid of the foregoing drawbacks and whose construction is particularly sturdy, and easy to assemble, and whose components have excellent mechanical strength.

According to the invention there is provided a clutch plate of the foregoing type comprising the improvement wherein the flange of the first damping means comprises a selected one of the washers of the second stage damping means and the guide washers of the first stage damping means are fixed for rotation with the hub.

Owing to this arrangement, in combination with the flange of the second stage damping means which is mounted with angular clearance on the hub, the clutch plate is very conveniently to assemble by providing two subassemblies, one of the subassemblies comprising the hub, the one guide washer of the second stage damping means forming the flange of the first stage damping means, the guide washers of the first stage damping means and the resilient means of the first stage damping means.

The other subasembly comprises the flange of the second stage damping means and the nonselected one of the washers of the second stage damping means which moreover may be part of either one of the subassemblies. Thereupon it suffices to juxtapose the two subassemblies by mounting the flange of the second stage damping means on the hub, then fixing the guide washers of the second stage damping means together.

It will be appreciated that the construction is very robust since the flange of the second stage damping means is intact and is not weakened by the presence of the second stage damping means. In addition it will be noted that the number of components of the clutch plate is reduced since one of the guide washers of the second stage damping means comprises the flange of the first stage damping means.

These and other features and advantages of the invention will be brought out in the description which follows, given by way example, of an embodiment of the invention, with reference to the accompanying drawings.

BRIEF DESCRIPTION OF THE DRAWINGS

FIG. 1 is a partial elevational view, with a cutaway portion, of a clutch plate according to the invention;

FIG. 2 is a cross-sectional view of the clutch plate taken along broken line II—II in FIG. 1;

DESCRIPTION OF THE PREFERRED EMBODIMENT

Figure 3:
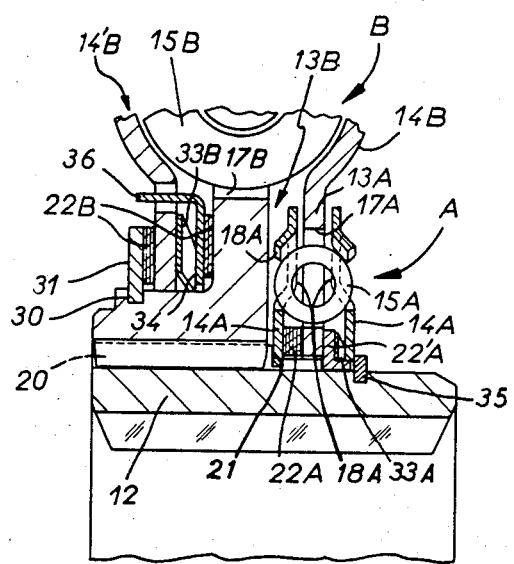
FIG. 3 is an enlarged view of a detail of FIG. 2 in the vicinity of the hub.

The illustrated embodiment of FIGS. 1-3 the clutch plate is adapted for a motor vehicle friction clutch. The clutch plate includes a friction disc 10 having a plurality of segments for supporting friction facings 11, and a hub 12. The friction facings 11 carried by the friction disc 10 are adapted to be clamped between the two plates fixed for rotation with the driving shaft of the vehicle and the hub 12 is slidably mounted on the transmission input shaft by means of splines.

The friction disc 10 for supporting the friction facings 11 and the hub 12 are mounted for a predetermined range of limited angular displacement relative to each other and are coupled together through two staged torsion damping means generally designated by reference characters A and B.

The first stage torsion damping means A is lighter or lower-rated than the second stage torsion damping means B and is adapted to absorb vibrations in particular operating conditions in which the torque transmitted by the clutch plate is very low or nil, for example when the motor vehicle is idling, and the second stage torsion damping means B which is stiffer is adapted to operate in during normal operating conditions in which the torque transmitted by the clutch plate is substantial.

The first stage damping means, as best seen in FIG. 3, comprises a radial flange 13A, two guide washers 14A fixed to each other and disposed on axially opposite sides of the flange I3A and resilient means 15A circumferentially interposed between the radial flange 13A and guide washers 14B. The guide washers 14A are fixed to each other by means of rivets 16A which extends through openings 16'A in flange 13A and the resilient means 15A comprises a circumferential array of one or more sets of springs (a single set as illustrated) mounted in windows 17A of flange 13A and between stamped portions 18A in guide washers 14A.

Likewise the second stage damping means B comprises a radial flange 13B of L-shaped cross-section, as illustrated, two guide washers 14B, 14B' fixed to each other and disposed on axially opposite sides of the flange 13B and resilient means 15B interposed circumferentially between the flange 13B and guide washers 14B, 14'B. The guide washers 14B, 14'B are fixed to each other by means of rivets 16B (FIG. 2) and the resilient means 15B comprise one or more groups of one or more sets of springs (a single group of two sets of springs illustrated herein) mounted in windows 17B in the flange 13B and between stamped portions 18B in the guide washers 14B, 14'B.

The first stage damping means 1 is designed to operate between the hub 12 and the second stage damping means B. More particularly, the flange 13A of the first stage damping means A which comprises one of the guide washers 14B of the second stage damping means B and the guide washers 14A of the first stage damping means A are fixed for rotation with hub 12.

Flange 13B of the second stage damping means B has splines on its inner periphery cooperating with complementary splines so on hub 12 with angular clearance formed therebetween.

It will be noted that the splines 20 on hub 12 are truncated at the end facing the guide washer 14A adjacent flange 13B so as to form therewith, and therefore with the first stage damping means A, a transverse shoulder 21. In practice, for rigidly fixing the guide washer 14A for rotation with hub 12, the guide washer 14A has at its inner periphery teeth by which it meshes without play the fruncated part of the splines 20 on hub 12 the guide washers 14B, 14'B of the second stage damping means B fixed relative to friction disc 10. To this end one of the friction disc 10 is fixed to the guide washer 14'B by rivets 21 (see FIG. 2).

The foregoing unit comprises two pre-assembled subassemblies. One of the subassemblies comprises a single component defining both the flange 13A of the first stage damping means A and one of the guide washer 14B of the second stage damping means B guide washers 14A of the first stage damping means A, the resilient means 15A of the first stage damping means B, and hub 12. The other subassembly comprises flange 13B of the second stage damping means B and the other guide washer 14'B of the second stage damping means B. As for the resilient means 15B of the second stage damping means they may be part of either one of the subassemblies and preferably part of the one subassembly including flange 13B and guide washer 14B, their seating being better. Alternatively the resilient means 15B of the second stage damping means may be installed when the two subassemblies are assembled together.

Moreover it will be noted that in FIG. 2 the washer 14B which defines flange 13A does not carry the friction disc 10 but rather the other guide washer 14'B. Consequently, the friction disc 10 is part of the subassembly to which it is fixed.

Each one of the damping means A, B is advantageously fitted with friction means interposed between its various components and suitably spring biased. At 22A and 22'A are seen the friction means of the first stage damp.ing means A and at 22B is seen the friction means of the second stage damping means B. The various friction means 22A, 22'A, 22B comprise , e.g., small washers of friction material, 22A, 22B, and in the illustrated embodiment the resilient bias is effected by crinkle washers 33A, 33B such as sold under the trade name Onduflex. Of course, these components are part of the respective subassemblies.

From the guide washer 14B axially remote from the first stage damping means A, and to left in FIG. 3, there is in succession a shoulder 30 fixed axially relative to the axial part of the L-shaped flange 13B, and formed by swaging as shown or by means of a retaining ring, a backing washer 31, a friction washer 22B and, between guide washer 14'B and the transverse or radial part of the L-shaped flange 13B, in succession, a crinkle washer 33B, a backing washer 34 and another friction washer 22B.

Backing washer 31 is thus fixed for rotation with flange 13B and backing washer 34 is fixed for rotation with guide washer 14'B by means of a lug 36 on washer 34 as illustrated.

It will also be noted that the axially outer friction washer 22B and the backing washer 31 associated therewith are disposed entirely axially within the axially outermost parts of the guide washer 14'B that is the corresponding stamped portions 18B.

On the guide washer 14B side, i.e., to the right as viewed in FIG. 3, which is the side of the first stage damping means, there is provided between guide washers 14A and on a first (or right) side of flange 13A, a friction washer 22'A defining a bearing member and a crinkle washer 33A and on the other side a friction washer 22A. In the illustrated embodiment, the friction washer 22'A cooperates with a smooth part of hub 12.

Also, axially inside the stamped portions of the guide washers 14A to the right are viewed in FIG. 3, a retaining ring 35 for axially holding the one subassembly and compressing the crinkle washer is anchored in hub 12.

The clutch plate thus described may be assembly in an extremely simple manner.

First, the one subassembly comprising guide washer 14B , flange 13A, guide washers 14A, resilient means 14A, resilient means 15A and hub 12 is prepared. In practice the springs forming the resilient means 15A are engaged without clearance between the stamped portions 18A of the guide washers 14A and in the windows 17A of the flange 13A.

The other subassembly comprises the flange 13B, the guide washer 14'B and the friction disc 10 fixed to guide washer 14'B and preferably the resilient means 15B.

In practice the springs defined by the resilient means 15B are received without clearance, and preloaded between the stamped portions 18B of guide washer 14B, 14'B which hold the same at least some of the springs are also received without clearance in housings 17B in flange 13B.

The two subassemblies are then put together by mounting the flange 13B with angular clearance on hub 12 and then rigidly securing guide washers 14B, 14'B together by means of rivets 16B.

Finally, the retaining ring or clip 35 is snapped into position.

When the torque transmitted is very low or nil, for example when motor vehicle is idling, the second stage damping means B is too stiff to come into operation and only the low-rated first stage damping means A is operative to absorb idling noise.

When the torque increase, in either direction, the flange 13A admits of angular displacement relative to guide washers 14B, 14'B limited by a the angular clearance batween the flange 13B and hub 12, the second stage damping means B becomes operative and absorbs in the customary manner vibrations occurring in the normal operation and within a predeterminal range of diaplacement limited by abutments, here defined by the totally compressed condition of springs of resilient means 15B, the flange 13B being angularly displaceable relative to the guide washers 14B, 14'B during the second stage operation.

The very simplified construction of the clutch plate according to the invention will be appreciated wherein the flange 13B is mounted with angular clearance on hub 12 as well as the special, convenient assembly of the clutch plate owing to the two pre-assembled subassemblies which are joined together simply by rivets 16B and axially retained by retaining clip or ring 35. It will be noted that guide washer 14B which defines the flange 13A is part of one subassembly whereas the other guide washer 14'B to which the friction disc 10 is fixed is part of the other subassembly.

It will be appreciated that in the illustrated embodiment of the present invention the implantation of the first stage damping means A is facilitated by the L-shaped fange 13B which leaves the space situated to the right of flange 13B entirely free. This space is thus free for the first stage damping means which forms part of the one subassembly with hub 12.

Further, the L-shaped flange 13 permits the location of springs defining resilient means 15A of the first stage damping means A as close as possible to the axis of the clutch plate which is all the more advantageous since the light springs of the resilient means 15A which are highly sensitive to centrigual force are relatively shelted.

The present invention is not intended to be limited to the illustrated and described embodiment but encompasses all variations and modifications understood to those skilled in the art without departing from the spirit and scope of the appended claims. What is claimed is:

1. A clutch plate comprising a friction disc carrying friction facings and a hub mounted for angular movement relative to each other within a predetermined range of angular displacement, first and second stage torsion damping means coupling said friction disc and hub together, the first stage torsion damping means being lower rated than the second stage torsion damping means, each of said torsion damping means including a radial flange, two guide washers fixed to each other and disposed an axially opposite sides of the associated flange, and resilient means interposed circumferentially between each of the flanges and the associated guide washers, the first stage damping means being operatively connected between said hub and said second stage damping means and the flange of the second stage damping means being mounted with angular clearance on said hub, said friction disc being fixed to one of said guide washers of said second stage damping means, said flange of said first stage damping means being defined by a selected one of said guide washers of the second stage damping means and said guide washers of said first stage damping means being fixed for rotation with said hub.

2. The clutch plate according to claim 1, wherein said clutch plate comprises two preassembled subassemblies, one of said subassemblies comprising the flange, the guide washers and the resilient means of said first stage damping means, and the other subassembly comprising the nonselected guide washer and the flange of said second stage damping means, said resilient means of said second stage damping means being part of either one of said subassemblies.

3. The clutch plate according to claim 2, wherein said two subassemblies are connected together by fixing means interconnecting said guide washers of said second damping means.

4. The clutch plate according to claim 2, wherein friction means are interposed axially between each of said flanges and the guide washers of the associated torsion damping means and are part of the respective preassembled subassemblies.

5. The clutch plate according to claim 1, wherein friction means are interposed axially between each of said flanges and the guide washers of the associated torsion damping means and wherein said friction means of said second stage damping means comprise at least one friction washer disposed axially outside the space defined between the guide washers of said second stage damping means.

6. The clutch plate according to claim 1, wherein a splined connection with angular play is provided between the hub and the flange of said second stage damping means, the splines of the hub being truncated and defining a transverse shoulder for that one of said guide washers of said first stage damping means axially adjacent the flange of said second stage damping means.

7. The clutch plate according to claim 6, wherein said one of said guide washers of said second stage damping means has a toothed inner periphery in clearance free meshing relation with the truncated splines of said hub.

8. The clutch plate according to claim 1, wherein said nonselected guide washer of said second stage damping means carries said friction disc.

9. The clutch plate according to claim 1, wherein said flange of said second stage torsion damping means is part of a member of L-shaped cross section, and said member including a hub portion for mounting said nonselected one of said guide washers of said second stage damping means.

10. The clutch plate according to claim 1, wherein said flange of said second stage torsion damping means is part of a member of L-shaped cross section, and said member including a hub portion for mounting said nonselected one of said guide washers of said second stage damping means, said member supporting the other of said subassemblies.

* * * * *